United States Patent [19]

Saito

[11] Patent Number: 4,786,808

[45] Date of Patent: * Nov. 22, 1988

[54] RESIDUAL IMAGE ERASING APPARATUS FOR STIMULABLE PHOSPHOR SHEET

[75] Inventor: Tokukazu Saito, Kanagawa, Japan

[73] Assignee: Fuji Photo Film Co., Ltd., Kanagawa, Japan

[*] Notice: The portion of the term of this patent subsequent to Aug. 18, 2004 has been disclaimed.

[21] Appl. No.: 837,223

[22] Filed: Mar. 7, 1986

[30] Foreign Application Priority Data

Mar. 11, 1985 [JP] Japan .................................. 60-48074
Mar. 11, 1985 [JP] Japan .................................. 60-48075

[51] Int. Cl.$^4$ .............................................. G01T 1/105
[52] U.S. Cl. .............................. 250/327.2; 250/484.1
[58] Field of Search .......................... 250/327.2, 484.1

[56] References Cited

U.S. PATENT DOCUMENTS 4,496,973  1/1985  Horikawa et al. ............... 250/327.2
4,687,937  8/1987  Aagano et al. .................... 250/327.2

Primary Examiner—Howell Janice A.
Assistant Examiner—Richard Hanig
Attorney, Agent, or Firm—Sughrue, Mion, Zinn, Macpeak and Seas

[57] ABSTRACT

An apparatus for erasing a residual image on a stimulable phosphor sheet comprises a detector for detecting the distribution of residual radiation energy in a predetermined direction, a linear erasing light source extending in the width direction of the stimulable phosphor sheet normal to the predetermined direction, a device for moving the stimulable phosphor sheet with respect to the linear light source in the predetermined direction, and a controller for controlling the linear light source and/or the movement device to adjust the light exposure amount at each portion of the stimulable phosphor sheet on the basis of the output of the detector. Or, the apparatus comprises an erasing light source comprising a plurality of light emitting elements positioned to face the stimulable phosphor sheet which is stationary, whereby illuminance is increased at a portion of the stimulable phosphor sheet where the level of residual radiation energy is high and the stimulable phosphor sheet is exposed to the erasing light at a nonuniform illuminance.

9 Claims, 4 Drawing Sheets

RESIDUAL IMAGE ERASING APPARATUS FOR STIMULABLE PHOSPHOR SHEET

BACKGROUND OF THE INVENTION

1. Field of the Invention

This invention relates to an apparatus for effectively erasing a residual image on a stimulable phosphor sheet which is used repeatedly. This invention particularly relates to an apparatus for effectively erasing a residual image on the stimulable phosphor sheet repeatedly used in a radiation image recording and reproducing system wherein the stimulable phosphor sheet is exposed to a radiation to have a radiation image stored thereon and then exposed to stimulating rays which cause the stimulable phosphor sheet to emit light in proportion to the stored radiation energy, the emitted light is detected and converted into an electric image signal, and the electric image signal is processed and used for reproducing a visible image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored thereon, and is then scanned with stimulating rays such as a laser beam which cause it to emit light in proportion to the radiation energy stored. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). The stimulable phosphor sheet used in the radiation image recording and reproducing system may be in any of various forms such as a panel, drum or the like, which are herein generally referred to as sheets. For reasons of economy, it is desirable that the stimulable phosphor sheet be used repeatedly.

Theoretically, when the stimulable phosphor sheet is exposed to stimulating rays of a sufficient intensity to cause the sheet to emit light in proportion to the stored radiation energy at the image read-out step, the stored radiation energy should be released completely and disappear. Actually, however, since the intensity of the stimulating rays used at the image read-out step is not sufficient to completely erase the stored radiation energy, a part of the stored radiation energy remains unerased in the stimulable phosphor sheet, so that when the sheet is used repeatedly, the unerased radiation energy causes noise to arise in the visible image reproduced from the reused sheet.

As described, for example, in U.S. Pat. No. 4,400,619, the aforesaid residual image can be erased by stimulating the stimulable phosphor sheet by light having a wavelength within the stimulation wavelength range for the stimulable phosphor constituting the stimulable phosphor sheet before the next image recording on the stimulable phosphor sheet, thereby sufficiently releasing the stored radiation energy. In order to completely erase the residual image, the light exposure amount (i.e. illuminance $\times$ time) should be adjusted to as large a value as possible. However, from the viewpoint of decrease in energy requirement and erasing time, and service life of the erasing light source, it is desirable that the light exposure amount be limited to the minimum necessary value. In order to satisfy the two incompatible requirements, the applicant in U.S. patent application Ser. No. 440,046 (now U.S. Pat. No. 4,584,482) proposed detecting the residual radiation energy level stored on a stimulable phosphor sheet and adjusting the erasing light exposure amount in accordance with the detected residual radiation energy level.

By controlling as described above, it is possible to adjust the light exposure amount to a necessary, sufficient value for each stimulable phosphor sheet, and to satisfy the two incompatible requirements described above for each stimulable phosphor sheet.

However, there are a portion of a high level of stored radiation energy (and consequently a high level of residual radiation energy) and a portion of a low level of stored radiation energy (and consequently a low level of residual radiation energy) on the one stimulable phosphor sheet. Therefore, in the aforesaid method, a portion of the sheet is exposed to an unnecessarily large light exposure amount.

SUMMARY OF THE INVENTION

The primary object of the present invention is to provide an apparatus for erasing a residual image on a stimulable phosphor sheet, which eliminates unnecessary erasing light irradiation on a stimulable phosphor sheet.

Another object of the present invention is to provide an apparatus for erasing a residual image on a stimulable phosphor sheet, which has markedly large effects of decreasing energy requirement and shortening the erasing time.

The present invention is based on the finding that, in most radiation images of an object such as the human body, the level of stored radiation energy changes in a predetermined direction. For example, as shown in FIG. 1, background portions 2, 2 where the radiation for image recording has directly impinged without passing through an object are present outside of an object image 1, and a bone image 3 of the bone through which less radiation has passed is present inside of the object image 1. Thus the level of stored radiation energy changes in the direction of the arrow A (horizontal direction in FIG. 1).

The present invention provides an apparatus for erasing a residual image on a stimulable phosphor sheet in which a stimulable phosphor sheet capable of being repeatedly used for radiation image recording and read-out is exposed to erasing light after radiation image read-out, and the residual image caused by residual radiation energy on the stimulable phosphor sheet is erased, the apparatus comprising:

(i) an energy distribution detecting means for detecting the distribution of residual radiation energy, which is distributed in a predetermined direction, in said predetermined direction, (ii) a linear light source extending in a sheet width direction normal to said predetermined direction for emitting residual image erasing light over the entire width of said stimulable phosphor sheet, (iii) a movement means for moving said stimulable phosphor sheet with respect to said linear light source in said predetermined direction so that said stimulable phosphor sheet is exposed to the residual image erasing light over the entire length of said stimulable phosphor sheet, and (iv) a control means for receiving an output of said energy distribution detecting means and controlling said linear light source and/or said movement means to adjust the light exposure amount at each portion of said stimulable phosphor sheet in accordance with the level of the distribution of residual radiation energy at each portion of said stimulable phosphor sheet in said predetermined direction.

Since the level of residual radiation energy on the stimulable phosphor sheet is correlated with the level of energy of light emitted by the sheet at the image read-out, the distribution of residual radiation energy may be detected from the electric image signal obtained by the image read-out. Or, a photodetector of the same type as the photodetector used for image read-out may be used for detecting the distribution of residual radiation energy, and the distribution of residual radiation energy may be detected from the output of the photodetector.

For example, in Japanese Unexamined Patent Publication Nos. 58(1983)-67241 (U.S. Pat. No. 4,527,060) and 58(1983)-83937, (U.S. Pat. No. 4,496,838) it has been proposed to conduct preliminary read-out for grasping the image input information on the stimulable phosphor sheet prior to final read-out for reproduction of the radiation image, and adjust the read-out gain in the final read-out to an appropriate value or by carrying out an appropriate signal processing of the electric image signal obtained by the final read-out on the basis of the image input information detected by the preliminary read-out. In general, the amount of radiation energy stored on the stimulable phosphor sheet prior to the preliminary read-out is proportional to the amount of radiation energy remaining on the sheet after the final readout. Therefore, distribution of residual radiation energy may be detected from the electric signal obtained by the preliminary read-out.

As understood from the specification, it should be noted that "moving a stimulable phosphor sheet with respect to a linear light source" means movement of the stimulable phosphor sheet relative to the linear light source and includes both the movement of the stimulable phosphor sheet with the linear light source stationary and the movement of the linear light source with the stimulable phosphor sheet stationary.

The present invention also provides an apparatus for erasing a residual image on a stimulable phosphor sheet in which a stimulable phosphor sheet capable of being repeatedly used for radiation image recording and read-out is exposed to erasing light after radiation image read-out, and the residual image caused by residual radiation energy on the stimulable phosphor sheet is erased, the apparatus comprising:

an erasing light source for emitting said erasing light and comprising a plurality of light emitting elements positioned to face said stimulable phosphor sheet which is stationary, whereby illuminance is increased at a portion of said stimulable phosphor sheet where the level of residual radiation energy is high and said stimulable phosphor sheet is exposed to said erasing light at a non-uniform illuminance.

In the present invention, since the erasing light exposure amount is finally adjusted in accordance with local changes in residual radiation energy level on one stimulable phosphor sheet, it is possible to markedly decrease power consumption of the erasing light source and to markedly shorten the residual image erasing time. In the apparatus of the present invention mentioned first, the effect of shortening the erasing time is obtained by controlling the movement speed of the stimulable phosphor sheet with respect to the erasing light source.

DESCRIPTION OF THE PREFERRED EMBODIMENTS

The present invention will hereinbelow be described in further detail with reference to the accompanying drawings.

Figure 2:
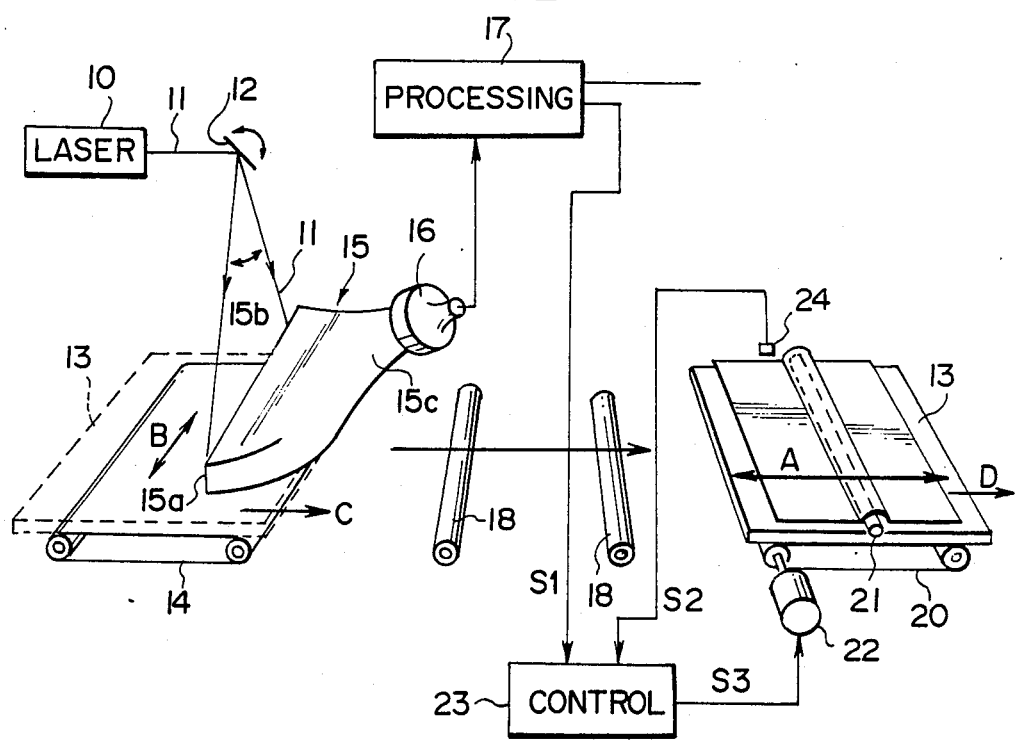
FIG. 2 is a schematic view showing an embodiment of the residual image erasing apparatus for the stimulable phosphor sheet in accordance with the present invention.

Referring to FIG. 2, image read-out conducted prior to residual image erasing will first be described below. A laser beam 11 of a predetermined intensity is emitted as stimulating rays by a laser beam source 10 to a galvanometer mirror 12. The laser beam 11 is deflected by the galvanometer mirror 12 and made to impinge upon a stimulable phosphor sheet 13 positioned below the galvanometer mirror 12 so that the sheet 13 is scanned by the laser beam 11 in the main scanning direction, i.e. in the width direction of the sheet 13 as indicated by the arrow B. While the laser beam 11 impinges upon the stimulable phosphor sheet 13, the sheet 13 is conveyed in the sub-scanning direction as indicated by the arrow C by a conveyance device 14, for example, an endless belt device. Therefore, scanning in the main scanning direction is repeated at an angle approximately normal to the sub-scanning direction, and the whole surface of the stimulable phosphor sheet 13 is two-dimensionally scanned by the laser beam 11. As the stimulable phosphor sheet 13 is scanned by the laser beam 11, the portion of the sheet 13 exposed to the laser beam 11 emits light having an intensity proportional to the stored radiation energy. The light emitted by the stimulable phosphor sheet 13 enters a transparent light guide member 15 from its light input face 15a positioned close to the sheet 13 in parallel to the main scanning line. The light guide member 15 has a flat-shaped front end portion 15b positioned close to the stimulable phosphor sheet 13 and is shaped gradually into a cylindrical shape towards the rear end side to form an approximately cylindrical rear end portion 15c which is closely contacted with a photomultiplier 16. The light emitted by the stimulable phosphor sheet 13 upon stimulation thereof and entering the light guide member 15 from its light input face 15a is guided inside of the light guide member 15 and up to the rear end portion 15c, and received by the photomultipler 16. Thus the light emitted by the stimulable phosphor sheet 13 in proportion to the radiation energy stored thereon is detected and converted into an electric image signal by the photomultiplier 16. The electric image signal thus obtained is sent to an image processing circuit 17 and processed therein. Though not shown, the electric image signal thus processed is then reproduced into a visible image and displayed, for example, on a CRT, or stored on a magnetic tape, or directly reproduced as a hard copy on a photographic film or the like.

Figure 1:
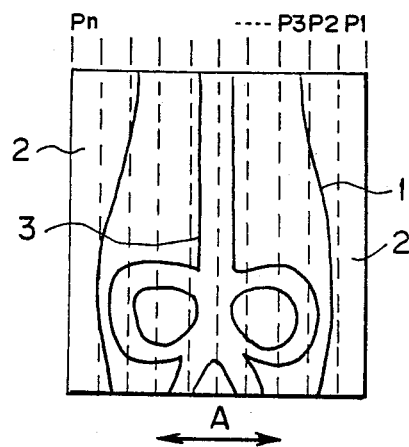
FIG. 1 is a schematic view showing the radiation image stored on a stimulable phosphor sheet.

After the image read-out is finished, the stimulable phosphor sheet 13 is sent to a sheet movement means 20, for example, an endless belt device, via a conveyance means 18 comprising rollers or the like. At this time, the stimulable phosphor sheet 13 is sent to the sheet movement means 20 so that the predetermined direction A in which the level of stored radiation energy changes as mentioned with reference to FIG. 1 is parallel to the movement direction D by the sheet movement means 20. A linear light source 21 is positioned close to the stimulable phosphor sheet 13 on the sheet movement means 20 and normal to the movement direction D. The linear light source 21 emits light of a predetermined intensity and having a wavelength within the stimulation wavelength range for the stimulable phosphor constituting the stimulable phosphor sheet 13, as disclosed, for example, in U.S. Pat. No. 4,400,619. When the stimulable phosphor sheet 13 is exposed to the erasing light, radiation energy remaining thereon is released and the residual image is erased. The length of the linear light source 21 is adjusted to a length longer than the width of the stimulable phosphor sheet 13, and the sheet 13 is moved by the sheet movement means 20 and passes under the linear light source 21 over the entire length of the sheet 3. Therefore, the residual image is erased over the whole surface of the sheet 13.

The sheet movement means 20 for moving the stimulable phosphor sheet 13 is driven by a variable speed motor 22 the speed of which is controlled by a motor control circuit 23. The image processing circuit 17 also acts as an energy distribution detecting means for detecting the distribution of residual radiation energy in the direction as indicated by the arrow A on the stimulable phosphor sheet 13. Before erasing of the residual image on the stimulable phosphor sheet 13 is conducted, the image processing circuit 17 divides the area on the sheet 13 into n divisions (P1, P2, . . . , Pn) in the predetermined direction as indicated by the arrow A as shown in FIG. 1 and detects the maximum enrgy level of light emitted by each division on the basis of the electric signal obtained by the photomultiplier 16. As described above, the maximum energy level of emitted light has a correlation with the radiation energy level remaining on the sheet 13 after the image read-out, i.e. after light is emitted by the sheet 13 in proportion to the stored radiation energy when the sheet 13 is exposed to stimulating rays. Based on the correlation, the image processing circuit 17 calculates the maximum level of residual radiation energy from the maximum energy level of light emitted by each division, and feeds a signal S1 representing the maximum level of residual radiation energy at each division to the motor control circuit 23. Upon receiving the signal S1, the motor control circuit 23 calculates the erasing light exposure amount (illuminance x time) necessary for nearly completely releasing the maximum level of residual radiation energy at each division. In this embodiment, since the illuminance of the linear light source 21 is constant, the motor control circuit 23 calculates the exposure time required for obtaining the erasing light exposure amount at each division, and calculates the movement speed by the sheet movement means 20 from the required exposure time.

Arrival of the forward end of the stimulable phosphor sheet 13 at the vicinity of the linear light source 21 is detected by a position sensor 24 which may be of the photoelectric type, and a position signal S2 is sent by the position sensor 24 to the motor control circuit 23. The variable speed motor 22 is rotated at a constant speed before the motor control circuit 23 receives the position signal S2. When the position signal S2 is sent to the motor control circuit 23, the motor control circuit 23 controls a rotation speed control signal S3 to control the rotation speed of the variable speed motor 22. The rotation speed control signal S3 controls the movement speed of the sheet movement means 20 to obtain the required exposure time at each of the divisions P1, P2, . . . , Pn calculated as described above by the motor control circuit 23. Accordingly, the movement speed of the stimulable phosphor sheet 13 is controlled at each of the divisions P1, P2, . . . , Pn, and each of the divisions P1, P2, . . . , Pn is exposed to the erasing light exposure amount necessary and sufficient to almost completely release the maximum level of residual radiation energy.

When all of the divisions P1, P2, . . . , Pn are exposed to the erasing light as described above, the residual image is erased over the whole surface of the stimulable phosphor sheet 13, and the sheet 13 becomes reusable for radiation image recording. By adjusting the sheet movement speed for each of the divisions P1, P2, . . . , Pn on one stimulable phosphor sheet 13, it is possible to eliminate unnecessarily long exposure of portions at which the level of residual radiation energy is low to the erasing light, to minimize the power consumption of the linear light source 21, and to shorten the time required for residual image erasing.

Figure 3:
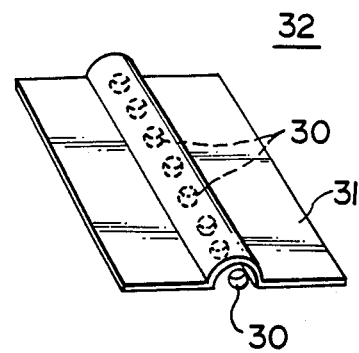
FIG. 3 is a perspective view showing a modified form of the linear light source used in the embodiment of FIG. 2.

Instead of the linear light source 21 which is in the straight tube form, it is also possible to use a linear light source 32 as shown in FIG. 3, which comprises a plurality of point light sources 30 arrayed in a line and a reflection plate 31 and which is formed to emit light linearly. Also, the stimulable phosphor sheet 13 may remain stationary, the linear light source 21 may be moved, and the movement speed of the linear light source 21 may be controlled.

In the aforesaid embodiment, the image processing circuit 17 acts also as the energy distribution detecting means for detecting the distribution of residual radiation energy in the direction as indicated by the arrow A on the stimulable phosphor sheet 13. However, the motor control circuit 23 may also act as the energy distribution detecting means. Alternatively, the energy distribution detecting means may be formed independently of the image processing circuit 17 and the motor control circuit 23. In these cases, the electric signal detected by the image read-out is sent from the photomultiplier 16 to the motor control circuit 23 or the energy distribution detecting means directly or via the image processing circuit 17. Further, the functions of the energy distribution detecting means may be shared by the image processing circuit 17 and the motor control circuit 23. For example, the image processing circuit 17 may calculate the maximum energy level of light emitted by each division, and the motor control circuit 23 may calculate the maximum level of residual radiation energy at each division based on the calculated maximum energy level of emitted light.

Figure 4:
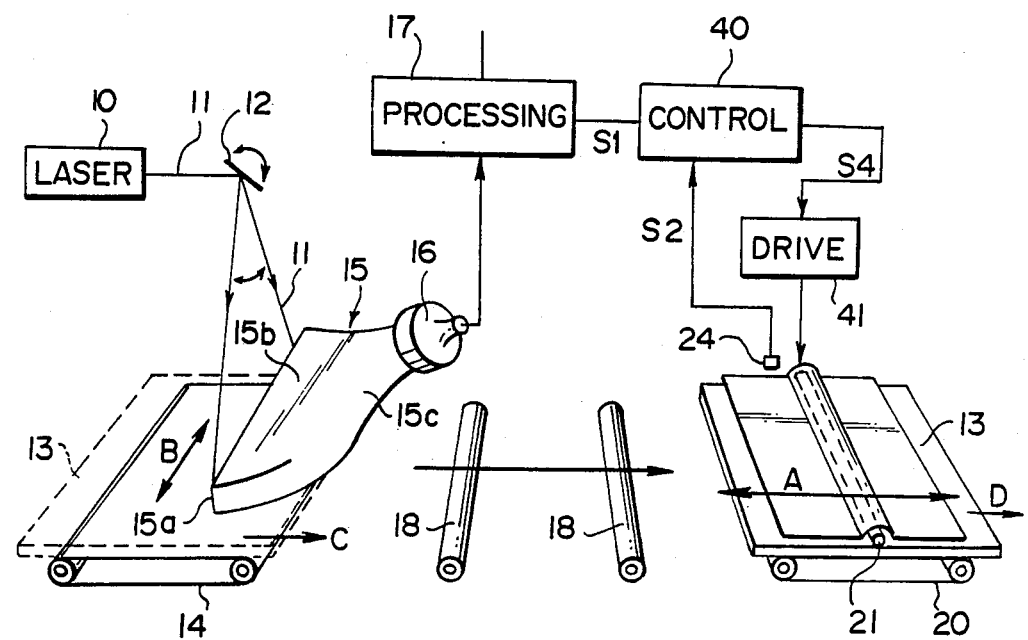
FIG. 4 is a schematic view showing another embodiment of the residual image erasing apparatus for the stimulable phosphor sheet in accordance with the present invention.

In the aforesaid embodiment, the erasing light exposure amount at each portion of the sheet 13 is adjusted to the necessary, sufficient value by changing the erasing light exposure time. However, it is also possible to maintain constant the erasing light exposure time, i.e. the movement speed of the sheet 13 with respect to the linear light source, and to control the illuminance of the erasing light. FIG. 4 shows such an embodiment of the apparatus in accordance with the present invention. In this embodiment, the sheet movement means 20 is rotated at a constant speed, and the sheet 13 is moved at a constant speed. The signal S1 representing the maximum level of residual radiation energy at each division and generated by the image processing circuit 17 and the position signal S2 generated by the position sensor 24 are input to a light source control circuit 40. Like the motor control circuit 23, the light source control circuit 40 calculates the erasing light exposure amount (illuminance x time) necessary and sufficient for each of the divisions P1, P2, ..., Pn. In this case, since the exposure time is fixed by the movement speed (constant) of the sheet 13, the necessary illuminance is fixed. An illuminance control signal S4 representing the necessary illuminance is input to a light source drive circuit 41, and the linear light source 21 is controlled to emit light at an intensity providing the necessary illuminance. In this embodiment, too, it is possible to minimize the power consumption of the linear light source 21.

Illuminance control of the linear light source 21 in the embodiment of FIG. 4 and movement speed control of the stimulable phosphor sheet 13 or the linear light source 21 (exposure time control) in the embodiment of FIG. 2 may be conducted infinitely. Or, a predetermined rank within which the residual radiation energy level at each of the divisions P1, P2, ..., Pn on the sheet 13 falls may be judged, and the light emission intensity of the linear light source 21 or the exposure time may be changed stepwise in accordance with the rank.

In the embodiments of FIGS. 2 and 4, the level of residual radiation energy is detected by use of the read-out image signal. However, it is also possible to use an apparatus of the same type as the image read-out apparatus shown in FIGS. 2 and 4 for detecting the level of residual radiation energy and to detect the level of residual radiation energy from the stimulable phosphor sheet 13 after the image read-out. In the case where the preliminary read-out as mentioned above is conducted, the level of residual radiation energy may be detected from the image signal obtained by the preliminary read-out.

Figure 5:
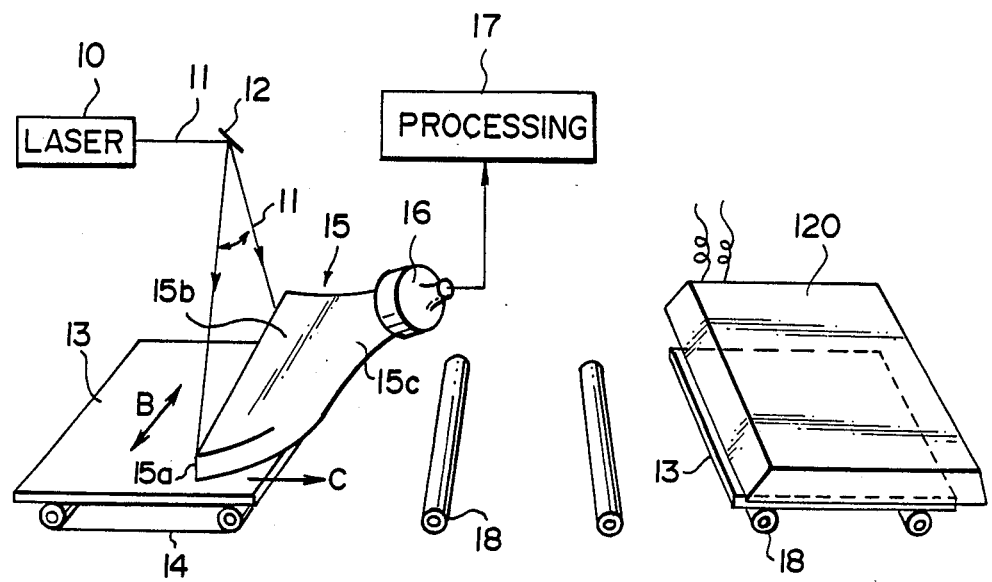
FIG. 5 is a schematic view showing a further embodiment of the residual image erasing apparatus for the stimulable phosphor sheet in accordance with the present invention.

FIG. 5 shows a further embodiment of the residual image erasing apparatus in accordance with the present invention. In this embodiment, as shown in detail in FIG. 6, an erasing light source 120 comprises a plurality of light emitting elements 121, 121, ... The light emitting elements 121, 121, ... positioned at a center region 120a are adjusted to the lowest light emission intensity, and those at regions 120b, 120c, 120d and 120e defined radially from the center region 120 towards the outside in this sequence are adjusted so that the light emission intensity increases towards the outer region.

Since the radiation image stored on the stimulable phosphor sheet 13 has a pattern as shown in FIG. 1 wherein the level of stored radiation energy is higher at the regions outside of the image forming regions, the erasing light source 120 emits light so that the outer regions of the sheet 13 are exposed to the erasing light of higher illuminance, and light of unnecessarily high illuminance is not emitted to the center region of the sheet 13 where the level of residual radiation energy is not so high.

Figure 6:
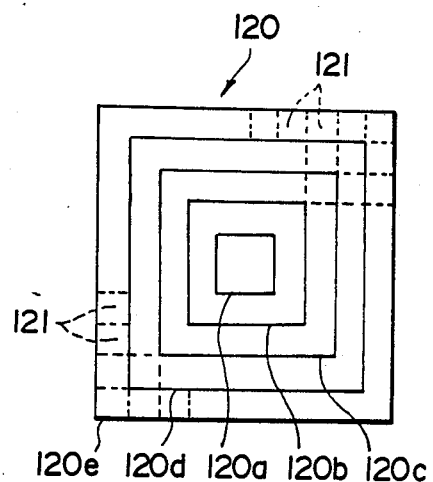
FIG. 6 is a plan view showing the erasing light source used in the embodiment of FIG. 5, FIGS. 7, 8 and 9 are plan vies showing modified forms of the erasing light source used in the embodiment of FIG. 5.
Figure 7:
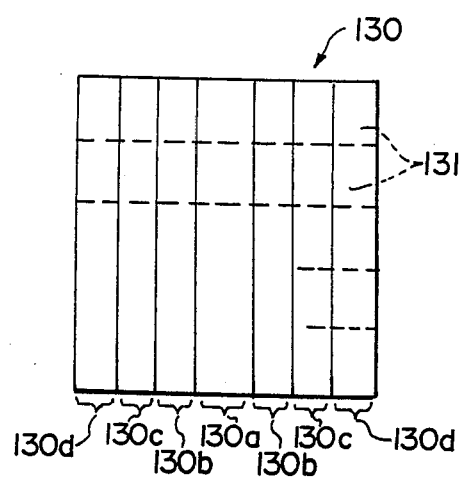

The distribution pattern of light emission intensity of the erasing light source is not limited to that shown in FIG. 6, and may be selected suitably for the radiation image pattern on the objective stimulable phosphor sheet. For example, as shown in FIG. 7, the light emission surface of an erasing light source 130 may be divided into band-like regions 130a, 130b, 130c and 130d, and light emitting elements 131, 131, ... at the respective regions may be adjusted so that the light emission intensity increases stepwise from the center region to the side end regions.

Figure 8:
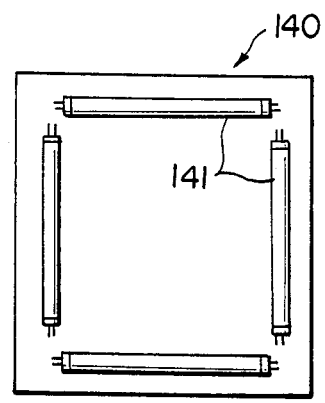

Instead of changing the light emission intensity of each light emitting element constituting the erasing light source, the arrangement of the light emitting elements may be made nonuniform to emit the erasing light at nonuniform illuminance to the stimulable phosphor sheet. For example, as shown in FIG. 8, an erasing light source 140 may be formed by positioning linear light emitting elements 141, 141, ... only at end portions of the erasing light source 140 and adjusting so that the illuminance is high at the sheet end portions and low at the center portions. Also, as shown in FIG. 9, an erasing light source 150 may be formed by changing the arrangement of point light emitting elements 151, 151, ..., thereby making the illuminance nonuniform.

The radiation image stored on the stimulable phosphor sheet may be of various approximate patterns other than that shown in FIG. 1. Therefore, instead of adjusting only to a single approximate radiation image pattern, the erasing light exposure pattern may be adapted to a plurality of approximate radiation image patterns (i.e. to a common composite image pattern in which the level of residual radiation energy at each point of the image forming region is represented by the maximum level of residual radiation energy among a plurality of image patterns). However, in this case, it may occur that a part of the stimulable phosphor sheet is exposed to unnecessarily high illuminance when residual image erasing is conducted for the stimulable phosphor sheet of some image pattern.

Figure 11:
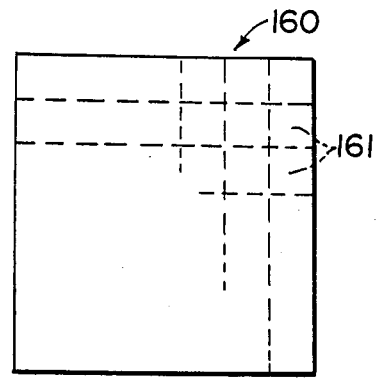
FIG. 11 is a plan view showing the erasing light source used in the embodiment of FIG. 10.
Figure 11:
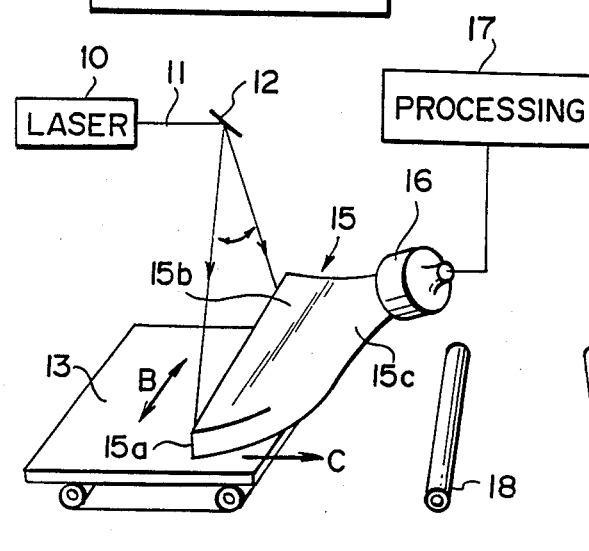
Figure 10:
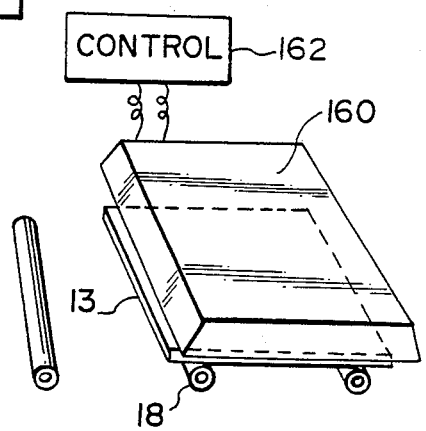
FIG. 10 is a schematic view showing a still further embodiment of the residual image erasing apparatus for the stimulable phosphor sheet in accordance with the present invention, and 10

FIG. 10 shows a still further embodiment of the residual image erasing apparatus in accordance with the present invention, which is adapted to changes in approximate pattern of radiation image. In this embodiment, an erasing light source 160 comprises a plurality of light emitting elements 161, 161, . . . positioned at uniform arrangement as shown in detail in FIG. 11. The light emitting elements 161, 161, . . . are independently controlled by a light source drive control circuit 162 so as to exhibit suitable light emission intensity. Therefore, the illuminance distribution pattern of the erasing light source 160 may be changed appropriately for the approximate radiation image pattern of the stimulable phosphor sheet subjected to residual image erasing.

Figure 9:
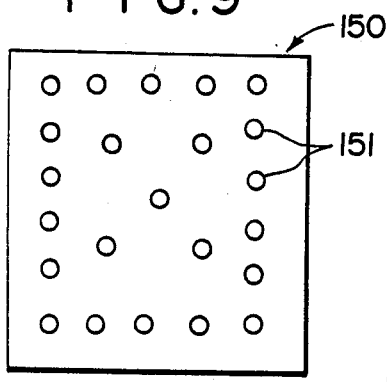

In the case where a predetermined illuminance distribution pattern is obtained by adjusting the arrangement of the light emitting elements as shown in FIGS. 8 and 9, by moveably mounting the light emitting elements, it is possible to change the illuminance distribution pattern by changing the layout of the light emitting elements.

When the approximate radiation image pattern on the stimulable phosphor sheet is detected by use of the image signal obtained by the image read-out and the light source drive control circuit 162 in FIG. 10 is controlled in accordance with the detected pattern, it is possible to adjust the illuminance distribution pattern of the erasing light appropriately for each stimulable phosphor sheet without investigating the approximate radiation image pattern on each sheet. As the image signal, the image signal obtained by the preliminary read-out may be used in the case where the preliminary read-out is conducted.

I claim:

1. An apparatus for erasing a residual image on a stimulable phosphor sheet in which a stimulable phosphor sheet capable of being repatedly used for radiation image recording and read-out is exposed to erasing light after radiation image read-out, and the residual image caused by residual radiation energy on the stimulable phosphor sheet is erased, the apparatus comprising:
   (i) an energy distribution detecting means for detecting the distribution of residual radiation energy, which is distributed in a predetermined direction, in said predetermined direction,
   (ii) a linear light source extending in a sheet width direction normal to said predetermined direction for emitting residual image erasing light over the entire width of said stimulable phosphor sheet,
   (iii) a movement means for moving said stimulable phosphor sheet with respect to said linear light source in said predetermined direction so that said stimulable phosphor sheet is exposed to the residual image erasing light over the entire length of said stimulable phosphor sheet, and
   (iv) a control mans for receiving an output of said energy distribution detecting means and controlling said linear light source and/or said movement means to adjust the light exposure amount at each portion of said stimulable phosphor sheet in accordance with the level of the distribution of residual radiation energy at each portion of said stimulable phosphor sheet in said predetermined direction.

2. An apparatus as defined in claim 1 wherein said energy distribution detecting means detects the distribution of residual radiation energy from an electric image signal obtained by said radiation image read-out.

3. An apparatus as defined in claim 1 wherein said energy distribution detecting means detects the distribution of residual radiation energy from an electric image signal obtained by preliminary read-out conducted prior to said radiation image read-out.

4. An apparatus as defined in claim 1 wherein said linear light source comprises a plurality of point light sources arrayed in a line, and a reflection plate.

5. An apparatus as defined in claim 1 wherein said movement means comprises an endless belt device for moving said stimulable phosphor sheet thereon.

6. An apparatus as defined in claim 1 further comprising a position sensor for detecting arrival of said stimulable phosphor sheet at said linear light source and sending a signal representing the position of said stimulable phosphor sheet to said control means.

7. An apparatus for erasing a residual image on a stimulable phosphor sheet in which a stimulable phosphor sheet capable of being repeatedly used for radiation image recording and read-out is exposed to erasing light after radiation image read-out, and the residual image caused by residual radiation energy on the stimulable phosphor sheet is erased, the apparatus comprising:
   an erasing light source for emitting said erasing light and comprising a plurality of light emitting elements positioned to face said stimulable phosphor sheet which is stationary, such that illuminance is increased at a portion of said stimulable phosphor sheet where the level of residual radiation energy is high and said stimulable phosphor sheet is exposed to said erasing light at a nonuniform illuminance.

8. An apparatus as defined in claim 7 wherein said erasing light source emits said erasing light at a nonuniform illuminance by changing the light emission intensity of each of said light emitting elements.

9. An apparatus as defined in claim 7 or 8 wherein said erasing light source emits said erasing light at a nonuniform illuminance by making nonuniform the arrangement of said light emitting elements.

* * * * *